US005494579A

United States Patent [19]

Robatel et al.

[11] Patent Number: 5,494,579

[45] Date of Patent: Feb. 27, 1996

[54] CONTINUOUS DECANTER FOR PROCESSING NUCLEAR PRODUCTS

[75] Inventors: Michel Robatel, Vernaison; Alain Fraux, Heyrieux; Jean-Pierre Davier, Lyons, all of France

[73] Assignee: Robatel, Genas, France

[21] Appl. No.: 249,208

[22] Filed: May 26, 1994

[30] Foreign Application Priority Data

Jun. 7, 1993 [FR] France ................................ 93 07020

[51] Int. Cl.[6] ............................ B01D 1/20; B01D 11/00

[52] U.S. Cl. ......................... 210/380.1; 494/53; 494/61; 494/62; 494/63; 494/85

[58] Field of Search ............................ 494/51, 53, 60, 494/61, 62, 63, 85; 210/360.1, 369, 370, 378, 380.1, 512.1

[56] References Cited

U.S. PATENT DOCUMENTS

| | | |
|---|---|---|
| 3,568,919 | 3/1971 | Nielsen . |
| 4,037,781 | 7/1977 | High ........................................ 494/51 |
| 4,585,558 | 4/1986 | Rubin . |
| 4,702,625 | 10/1987 | Davier . |
| 4,869,713 | 9/1989 | Davier . |

FOREIGN PATENT DOCUMENTS

| | | |
|---|---|---|
| 2039546 | 1/1971 | France . |
| 3501341 | 7/1986 | Germany . |

*Primary Examiner*—Robert A. Dawson
*Assistant Examiner*—David A. Reifsnyder
*Attorney, Agent, or Firm*—Dowell & Dowell

[57] ABSTRACT

A continuous decanter assembly suitable for processing nuclear materials comprises a mechanical assembly for driving a decanter bowl and an Archimedean screw. Sealing structure is provided to enable the decanter bowl and screw to be disconnected from the mechanical assembly and accessed by an operator without risk of nuclear contamination.

20 Claims, 6 Drawing Sheets

CONTINUOUS DECANTER FOR PROCESSING NUCLEAR PRODUCTS

BACKGROUND OF THE INVENTION

The present invention relates to a centrifugal decanter with continuous evacuation of the solid, for the processing of nuclear products.

Machines of this type are known, which generally comprise a mechanical zone separated from the active zone via a bearing structure in which a removable slab for biological protection is provided. The machine is generally a pendulous decanter operating by cycles, which comprises a vessel fixed to the bearing structure and inside which a decanter bowl is driven in rotation. The machine conventionally comprises a charging tank and a pipe which projects a jet of liquid under pressure for extraction of the decanted solid.

The vessel is provided with an evacuation of the clarified liquid, a retractable supply of the suspension to be decanted, and with a drain for the humid solid after decantation.

Operation of the machine by cycles requires that the flow be periodically stopped, this involving storage of the substance to be decanted. The decanted solid is eliminated by means of a jet of liquid under pressure which transforms it into a slurry which risks blocking the evacuation conduit. Moreover, due to its evacuation in humid form, the decanted solid comprises a quantity of liquid which reduces the quality of decantation of the substance.

The bowl of the machine is of large diameter in order to be able to place the different elements such as the charging tank and the pipe. The large dimension of the bowl requires a low speed of rotation due to the mechanical stresses, which implies a poor decantation of the substances. Finally, the larger the diameter of the bowl, the greater is the volume of substances to be treated, which is contrary to the processing of nuclear products.

It is a more particular object of the present invention to overcome these drawbacks.

The continuous decanter according to the invention has for an object to reduce the threshold of criticality for the same mass of processed product modifying its geometrical form while improving its quality.

SUMMARY OF THE INVENTION

To that end, the continuous decanter comprises in the mechanical zone an assembly which allows drive in rotation of a decanter bowl and an Archimedean screw placed in the active zone, and means making it possible to disconnect the mechanical assembly of the bowl and the screw in order to be able to intervene thereon.

In addition, the continuous decanter comprises no bearing or roller bearing for axially guiding the decanter bowl and the Archimedean screw in the active zone.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
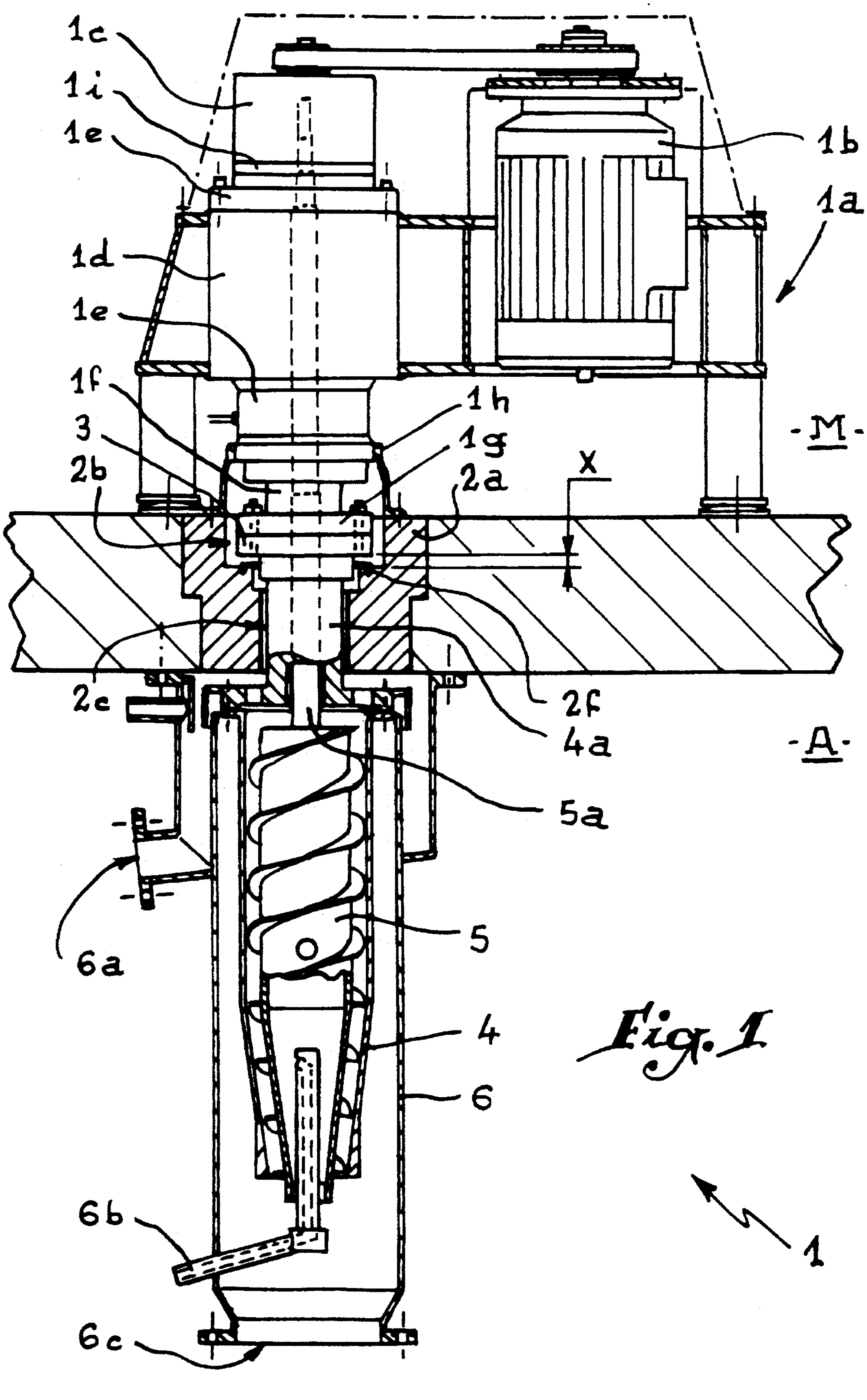
FIG. 1 is a longitudinal section illustrating the continuous decanter according to the present invention.
Figure 2:
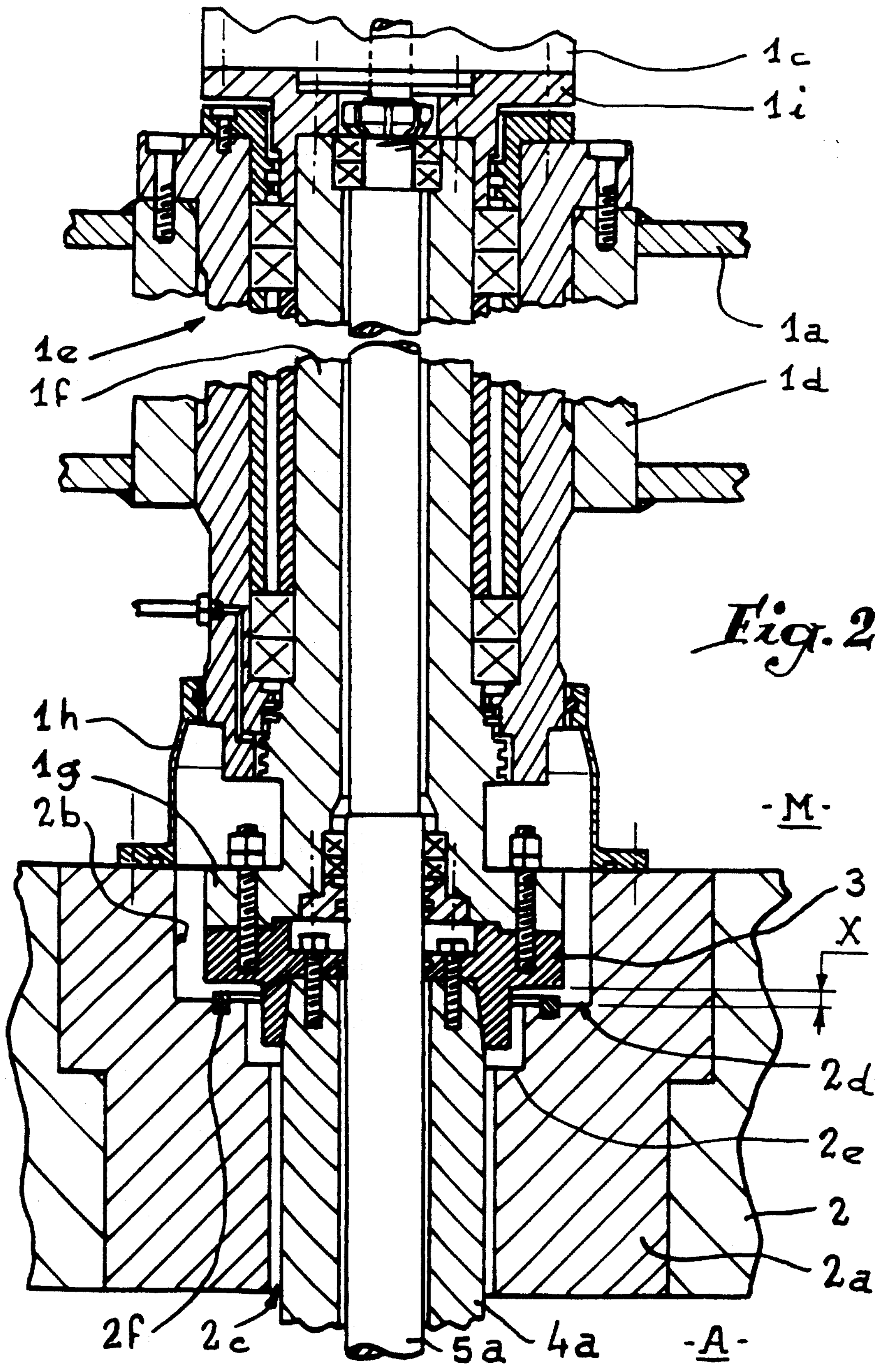
FIG. 2 is an enlarged section showing the device for coupling the bowl and the Archimedean screw with the mechanical assembly.

Referring now to the drawings, FIGS. 1 and 2 show a centrifugal decanter 1 with continuous evacuation of the processed solid. Decanter 1 comprises a mechanical zone M which is separated from an active zone A via a bearing structure 2 in which is provided a removable bushing 2*a* for biological protection. Bushing 2*a* defines a first bore 2*b* which communicates coaxially with a second bore 2*c* of smaller diameter traversing the rest of the bushing to form a passage between the two zones A and M.

The first bore 2*b* is separated from the second 2*c* by two successive shoulders 2*d*, 2*e*, for reasons which will be more apparent hereinafter.

In zone M is placed a metallic frame 1*a* which abuts on the bearing structure 2. Frame 1*a* supports in known manner a motor 1*b* which drives a reduction gear 1*c* in rotation via one or more belts.

On frame 1*a* and beneath the reduction gear 1*c* is welded along a vertical axis a tube 1*d* in which is provided a bearing 1*e*. Inside the bearing 1*e* are disposed ball or roller bearings for axially guiding a hollow sleeve 1*f* of which one of the ends cooperates by means of an intermediate piece 1*i* with the reduction gear 1*c* to drive it in rotation. Sleeve 1*f* presents a flange 1*g* which is placed coaxially inside the bore 2*b* of the biological slab 2*a*. Inside the bore 2*m*, the flange 1*g* is fixed by means of screws on an intermediate disc 3 which is fastened to a pin 4*a* traversing bore 2*c*. Pin 4*a* is secured to a decanter bowl 4 provided in the active zone A to drive it in rotation. Inside bowl 4 is disposed in known manner an Archimedean screw 5 fixed to a shaft 5*a* which traverses pin 4*a* of the bowl and which is guided axially inside sleeve 1*f* to cooperate with the reduction gear 1*c*.

The lower face of the intermediate disc 3 is provided just above the shoulder 2*d* of the bore 2*b* determining therewith an operational clearance X. Moreover, the shoulder 2*d* comprises an O-ring 2*f* whose outer diameter is slightly smaller than that of the intermediate disc 3.

In the active zone A and around the bowl 4 there is provided a vessel 6 which is fixed on the lower face of the bearing structure 2 so that it surrounds the removable bushing 2*a*. Vessel 6 comprises in its upper part an evacuation outlet 6*a* of the clarified liquid. In addition, in the lower part of vessel 6 is provided a fixed supply inlet 6*b* for introduction of the substance to be decanted. Vessel 6 presents beneath the supply inlet 6*b* an opening 6*c* in chute form for extraction of the decanted solid.

A seal 1*h* with double bearing is placed, at one end, on the periphery of the bore 2*b* and, on the other end, on the outer face of the bearing 1*e*, to constitute a tight separation between the active zone A and the mechanical zone M during operation of decanter 1.

It will be noted that bowl 4 and screw 5 are not supported axially in their lower, conical parts by bearings or roller bearings in order to facilitate, on the one hand, withdrawal thereof and, on the other hand, intervention on the mechanical assembly if a breakdown occurs, as will be seen hereinbelow.

The continuous decanter 1 described hereinabove operates in accordance with the same principle as all other continuous decanters.

Motor 1*b*, via reduction gear 1*c*, drives the decanter bowl 4 and the Archimedean screw 5 at different speeds.

The radioactive substance to be processed in the decanter bowl 4 is supplied via the fixed tube 6*b* so that the substance arrives in the middle of the thread of screw 5. The difference in speeds between bowl 4 and screw 5 makes it possible to direct the decanted solid in the lower or conical part of the decanter to be extracted via orifice 6*c* of vessel 6. On the contrary, the clarified liquid takes the reverse path, to be evacuated by overflow by means of tube 6*a*.

An essential particularity of the continuous decanter 1 described above lies in the fact that, if a breakdown occurs in the mechanical assembly located in zone M, an operator can intervene without risk of being contaminated.

In fact, the whole mechanical assembly, i.e. for example frame 1*a*, motor 1*b* up to reduction gear 1*c*, and even bearing 1*e* and sleeve 1*f*, may be withdrawn without risk of transferring radioactive particles between the two zones.

Figure 3:
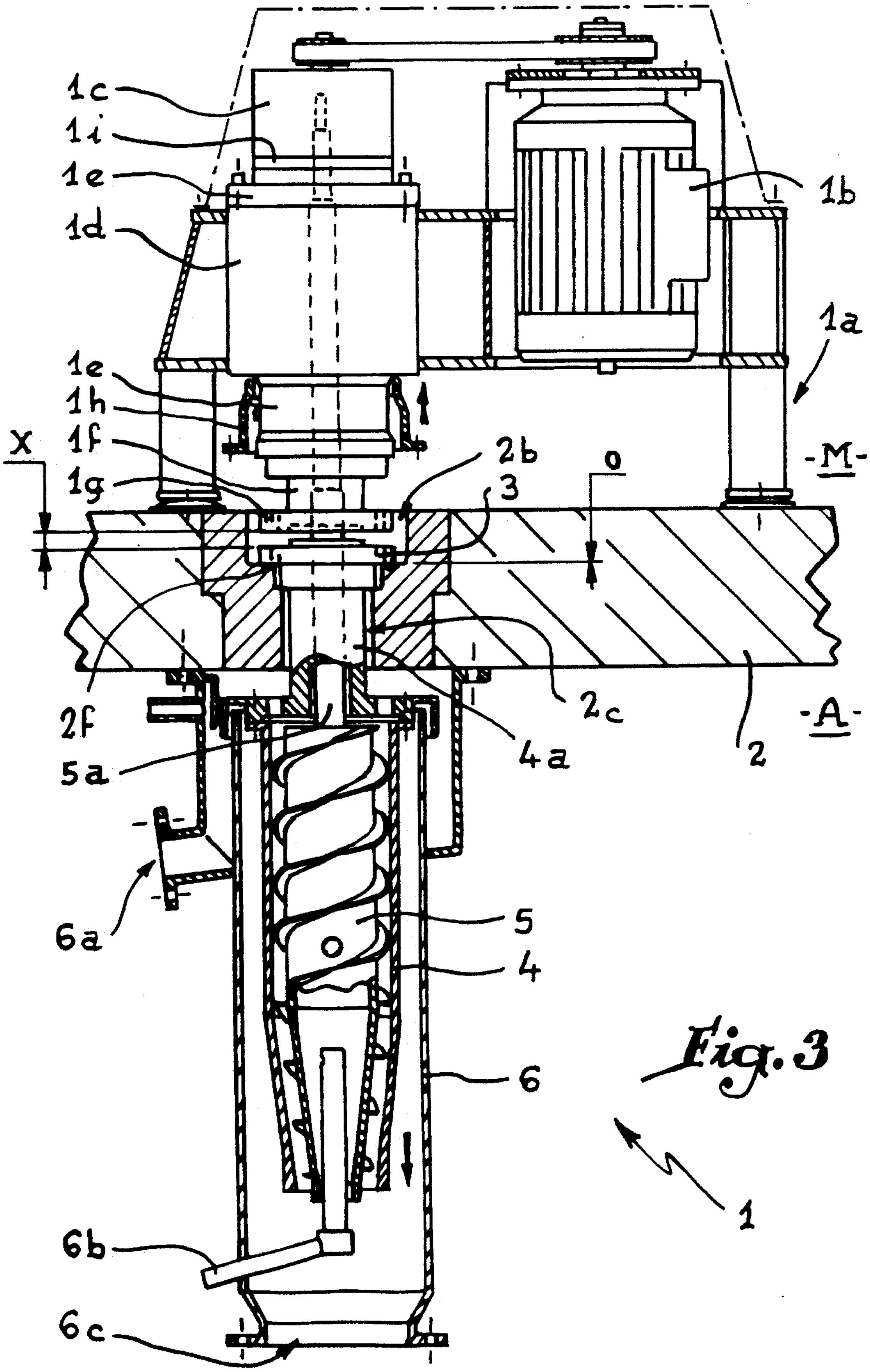
FIGS. 3 and 4 are views illustrating the different steps to be taken in order to withdraw the mechanical assembly totally or partially.
Figure 4:
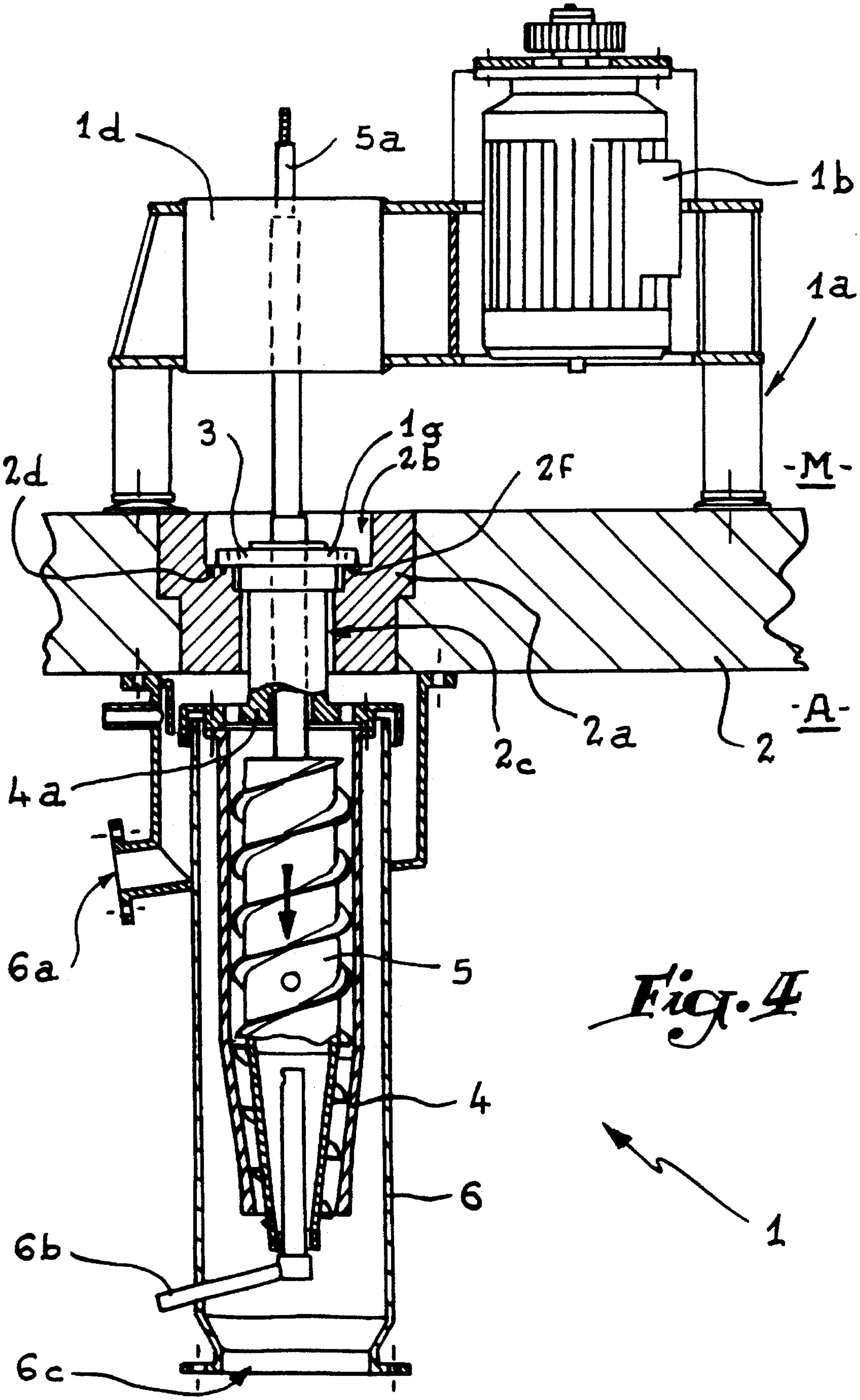

FIG. 3 shows the first step that the operator must take before any intervention in order to render zones A and M totally tight with respect to each other. To that end, the operator raises the static seal 1*h* so as to slide it on the outer wall of bearing 1*e*. The operator then removes the screws which retain flange 1*g* of sleeve 1*f* on the intermediate disc 3 fixed to pin 4*a* of bowl 4. When disconnection is effected, it is ascertained that the lower face of disc 3 comes into abutment on shoulder 2*d* of bore 2*b* in order to crush seal 2*f* to constitute a perfect seal between the two zones. It is ascertained that clearance X provided between the lower face of disc 3 and shoulder 2*d* is zero, being given that bowl 4 has descended vertically inside vessel 6 without risking abutting on the periphery of the upper tube 6*a*. Finally, the operator dismantles reduction gear 1*c* in order to release shaft 5*a* of screw 5. It is ascertained that, when shaft 5*a* is axially free, screw 5 descends vertically to abut via its thread on the conical part of bowl 4.

When these different steps are effected, the operator may then freely dismantle the whole mechanical assembly such as bearing 1*e* and sleeve 1*f* with a view to replacing the different roller bearings if necessary, as shown in FIG. 3. Similarly, the operator may change reduction gear 1*c* and motor 1*b* if desired.

The operator effects the reverse procedure to remount the mechanical assembly of the continuous decanter 1, tightness between zone M and zone A remaining perfect as disc 3 is in abutment against shoulder 2*d*.

Figure 5:
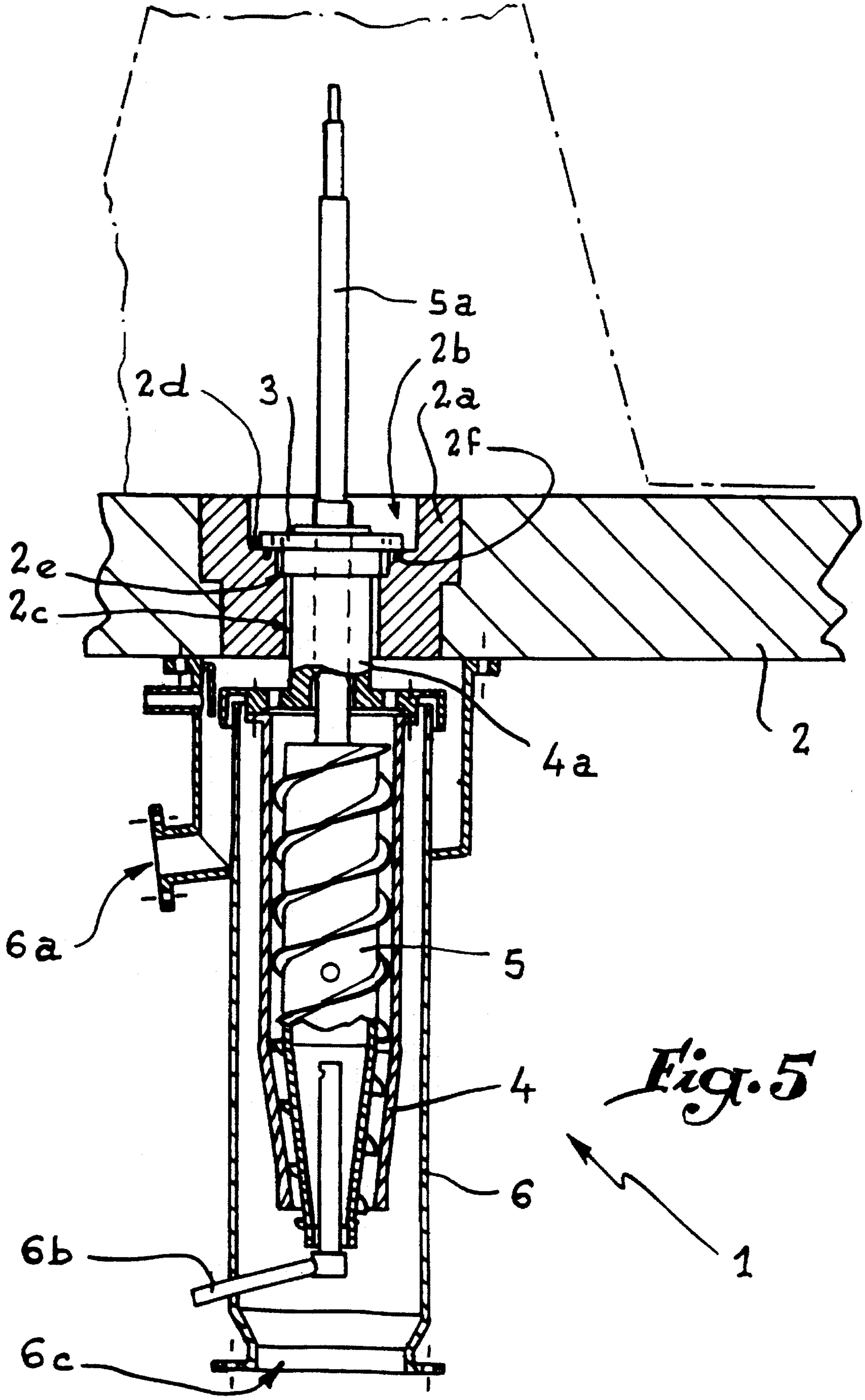
FIGS. 5 and 6 are sections representing the different steps, after total withdrawal of the mechanical assembly, of the extraction of the bowl and Archimedean screw from the active zone in a tight container or "castle".
Figure 6:
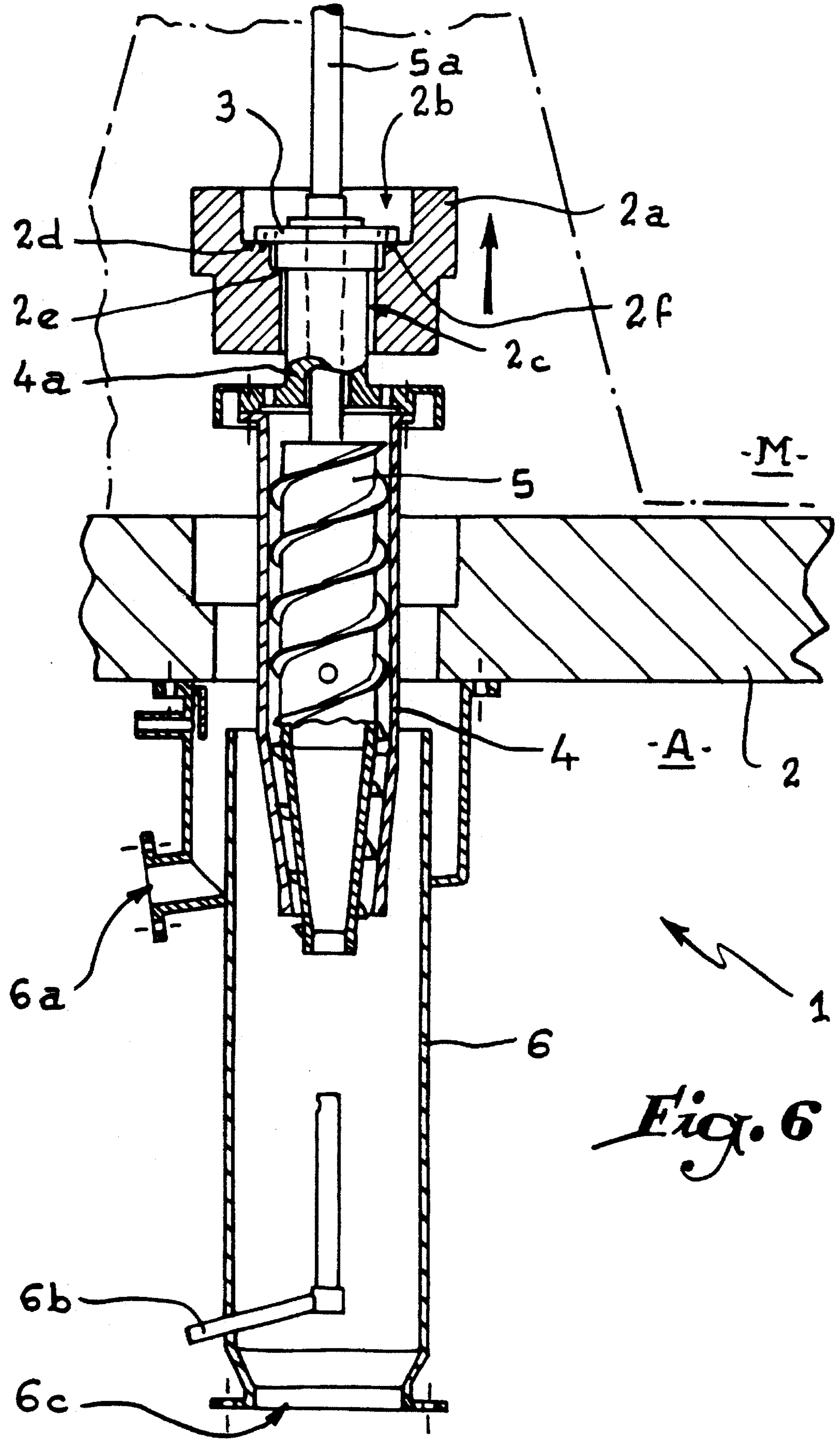

FIGS. 5 and 6 show the continuous decanter 1 without its frame 1*a*, i.e. when the operator has proceeded with total withdrawal thereof, as described above. Withdrawal of frame 1*a* enables the operator to intervene on the decanter bowl 4 and the Archimedean screw 5 if they are defective. Such intervention is effected in known manner in a tight container or "castle", the latter being shown in dashed and dotted lines.

Lifting means (not shown) are fixed on the removable bushing 2*a* to lift the assembly composed of the bowl and the screw inside the tight "castle". It will be noted that withdrawal is possible, being given that the intermediate disc 3 is in abutment on shoulder 2*d* of bore 2*b* and that the screw is against the conical part of the bowl.

It will be noted that vessel 6 remains fast with bushing 2 as well as supply 6*b*. Withdrawal of bowl 4 and of screw 5 is effected without human intervention in active zone A. Before withdrawing the "castle" shown in dashed and dotted lines, a tight slide closes the opening of the bearing structure 2 in which bushing 2*a* is placed so that no communication is possible between the two zones. Positioning of another bowl provided with another screw is effected under a tight "castle". The operator then proceeds with mounting the mechanical assembly described hereinabove until the bowl and screw are connected to the reduction gear 1*c*.

The continuous decanter 1 makes it possible to extract the solid dry, which considerably improves the quality of decantation of the substance. In addition, continuous operation increases yield of the machine and avoids storing substance to be decanted.

It will be noted that reduction of the diameter of screw 5 with respect to the conventional machines for an equivalent flowrate makes it possible to increase considerably the speed of rotation thereof. This high speed of rotation of the continuous centrifugal decanter 1 according to the invention and the extraction of the decanted solid dry, considerably improves the quality of decantation of the substance.

In addition, the elongated form of screw 5 modifies the geometry of the product processed which, for the same mass of product, enables more radio-active substances to be processed without ever attaining the threshold of criticality.

It must, moreover, be understood that the foregoing description has been given only by way of example and that it in no way limits the domain of the invention which would not be exceeded by replacing the details of execution described by any other equivalents.

What is claimed is:

1. A continuous decanter for processing nuclear materials, comprising:

a first portion including an Archimedean screw and a decanter bowl surrounding a portion of said screw in an operative condition;

a second portion including drive means connected to said screw for rotating said screw and said decanter bowl about an axis;

a bearing assembly disposed between said decanter bowl and said drive means; and first sealing means for forming a seal between said first and second portions when said decanter bowl and said screw are disconnected from said drive means to place the decanter in a non-operative condition so as to prevent the transfer of nuclear contamination between said first and second portions, and said first sealing means allowing fluid communication between said first and second portions in the operative condition.

2. The continuous decanter of claim 1, wherein said screw comprises a shaft, said bearing assembly comprises a bushing defining a bore, a gasket disposed in said bore, a pin mounted on said shaft and disposed in said bore, said pin being attached to said decanter bowl and to a disc, said disc being fastened to a sleeve mounted on said shaft, said sleeve being connected to said drive means, and said disc being spaced from said gasket in the operative condition.

3. The continuous decanter of claim 2, wherein said bushing is removable from said bearing assembly.

4. The continuous decanter of claim 3, wherein said screw and said decanter bowl are movable into said second portion when said bushing is removed from said bearing assembly.

5. The continuous decanter of claim 2, further comprising a second sealing means attached to said bushing in the operative condition so as to enclose an end of said bore and prevent the transfer of nuclear contamination between said first and second portions.

6. The continuous decanter of claim 2, wherein said disc abuts said gasket and forms said seal between said first and second portions when said sleeve is detached from said disc and moved relative thereto to the non-operative condition.

7. The continuous decanter of claim 1, wherein said second portion comprises bearings for guiding said screw with respect to said axis.

8. The continuous decanter of claim 1, wherein said screw comprises an exteriorly threaded portion which abuts a conical portion of said decanter bowl when said screw is disconnected from said drive means.

9. The continuous decanter of claim 1, wherein said first portion comprises a vessel attached to said bearing assembly and surrounding said decanter bowl and said screw, and said vessel includes a nuclear material supply inlet, a decanted liquid outlet and a decanted solid outlet spaced from said liquid outlet in a direction of said axis.

10. The continuous decanter of claim 9, wherein said supply inlet introduces nuclear material interiorly of said screw.

11. The continuous decanter of claim 10, wherein said decanter bowl and said screw rotate at different speeds about said axis.

12. A continuous decanter for processing nuclear materials, comprising:

- a first portion including an Archimedean screw having a shaft;
- a second portion including drive means connected to said shaft for rotating said screw and said decanter bowl about an axis;
- first sealing means for forming a first seal between said first and second portions when said decanter bowl and said screw are disconnected from said drive means to place the decanter in a non-operative condition so as to prevent the transfer of nuclear contamination between said first and second portions; and
- second sealing means for forming a second seal between said first and second portions in the operative condition so as to prevent the transfer of nuclear contamination between said first and second portions.

13. The continuous decanter of claim 12, further comprising a bearing assembly surrounding said shaft and being disposed between said decanter bowl and said drive means.

14. The continuous decanter of claim 13, wherein said bearing assembly comprises a bushing defining a bore, a gasket disposed in said bore, a pin mounted on said shaft and disposed in said bore, said pin being attached to said decanter bowl and to a disc, said disc being fastened to a sleeve mounted on said shaft, said sleeve being connected to said drive means, and said disc being spaced from said gasket in the operative condition.

15. The continuous decanter of claim 14, wherein said second sealing means is attached to said bushing in the operative condition so as to enclose an end of said bore and prevent the transfer of nuclear contamination between said first and second portions.

16. The continuous decanter of claim 15, wherein said disc abuts said gasket and forms said first seal between said first and second portions when said sleeve is detached from said disc and moved relative thereto to the non-operative condition.

17. The continuous decanter of claim 16, wherein said bushing is removable from said bearing assembly.

18. The continuous decanter of claim 17, wherein said screw and said decanter bowl are movable into said second portion when said bushing is removed from said bearing assembly.

19. The continuous decanter of claim 12, wherein said first sealing means allows fluid communication between said first and second portions in the operative condition.

20. The continuous decanter of claim 12, wherein said screw comprises an exteriorly threaded portion and said decanter bowl substantially surrounds said threaded portion in an operative condition, and said exteriorly threaded portion abuts a conical portion of said decanter bowl when said screw is disconnected from said drive means.

* * * * *